(12) United States Patent
Zhao et al.

(10) Patent No.: US 10,173,197 B2
(45) Date of Patent: Jan. 8, 2019

(54) POLYMER BEADS INCORPORATING SOLID PARTICULATE MATERIAL

(71) Applicant: Orica Australia Pty Ltd, Melbourne (AU)

(72) Inventors: Weiguo Zhao, Mount Waverley (AU); Matthew Roy Raymond, Carlton (AU)

(73) Assignee: IXOM OPERATIONS PTY LTD, East Melbourne (AU)

( * ) Notice: Subject to any disclaimer, the term of this patent is extended or adjusted under 35 U.S.C. 154(b) by 166 days.

(21) Appl. No.: 14/424,714

(22) PCT Filed: Aug. 28, 2013

(86) PCT No.: PCT/AU2013/000956
§ 371 (c)(1),
(2) Date: Feb. 27, 2015

(87) PCT Pub. No.: WO2014/032092
PCT Pub. Date: Mar. 6, 2014

(65) Prior Publication Data
US 2015/0218015 A1    Aug. 6, 2015

(30) Foreign Application Priority Data
Aug. 30, 2012  (AU) ................................ 2012903767

(51) Int. Cl.
*C02F 1/42*    (2006.01)
*B01J 47/014*  (2017.01)
(Continued)

(52) U.S. Cl.
CPC ......... *B01J 20/28092* (2013.01); *B01J 20/06* (2013.01); *B01J 20/28004* (2013.01);
(Continued)

(58) Field of Classification Search
None
See application file for complete search history.

(56) References Cited

U.S. PATENT DOCUMENTS

| 4,446,261 A | 5/1984 | Yamasaki et al. |
| 4,564,644 A | 1/1986 | Harris |

(Continued)

FOREIGN PATENT DOCUMENTS

| EP | 0135292 A1 | 3/1985 |
| EP | 1780544 A1 | 5/2007 |

(Continued)

OTHER PUBLICATIONS

International Search Report issued in corresponding International Patent Application No. PCT/AU2013/000956, dated Oct. 3, 2013, 5 pages.

(Continued)

*Primary Examiner* — Clare M Perrin
(74) *Attorney, Agent, or Firm* — Davis Wright Tremaine LLP

(57) ABSTRACT

The present invention relates to polymer beads comprising a polymeric matrix and having a pitted surface, the polymeric matrix (i) comprising polymerized monomer residues of (a) at least one mono-ethylenically unsaturated monomer, and (b) at least one crosslinking monomer having at least two ethylenically unsaturated groups separated by at least 4 consecutive acyclic atoms, and (ii) having distributed therethrough solid particulate material and polymeric porogen.

10 Claims, 5 Drawing Sheets

(51) Int. Cl.
| | |
|---|---|
| *H01F 1/42* | (2006.01) |
| *B01J 20/28* | (2006.01) |
| *B01J 20/06* | (2006.01) |
| *B01J 41/14* | (2006.01) |
| *B01J 39/20* | (2006.01) |
| *C08K 3/32* | (2006.01) |
| *C02F 1/28* | (2006.01) |
| *C02F 1/48* | (2006.01) |
| *C08K 3/22* | (2006.01) |
| *C02F 101/10* | (2006.01) |
| *C02F 101/22* | (2006.01) |
| *C02F 101/20* | (2006.01) |
| *C02F 101/16* | (2006.01) |
| *C02F 101/36* | (2006.01) |
| *C02F 101/38* | (2006.01) |
| *C02F 101/34* | (2006.01) |
| *C08F 2/44* | (2006.01) |
| *C08F 220/32* | (2006.01) |
| *C08F 222/10* | (2006.01) |

(52) U.S. Cl.
CPC ... *B01J 20/28009* (2013.01); *B01J 20/28019* (2013.01); *B01J 39/20* (2013.01); *B01J 41/14* (2013.01); *B01J 47/014* (2017.01); *C02F 1/285* (2013.01); *C02F 1/42* (2013.01); *C02F 1/488* (2013.01); *C08K 3/22* (2013.01); *H01F 1/42* (2013.01); *C02F 2001/422* (2013.01); *C02F 2001/425* (2013.01); *C02F 2101/103* (2013.01); *C02F 2101/105* (2013.01); *C02F 2101/106* (2013.01); *C02F 2101/163* (2013.01); *C02F 2101/20* (2013.01); *C02F 2101/22* (2013.01); *C02F 2101/34* (2013.01); *C02F 2101/345* (2013.01); *C02F 2101/36* (2013.01); *C02F 2101/38* (2013.01); *C02F 2303/18* (2013.01); *C02F 2305/12* (2013.01); *C08F 2/44* (2013.01); *C08F 220/32* (2013.01); *C08F 222/1006* (2013.01); *C08K 2201/01* (2013.01); *Y10T 428/2982* (2015.01)

(56) References Cited

U.S. PATENT DOCUMENTS

| | | | |
|---|---|---|---|
| 5,804,606 | A | 9/1998 | Surowiec et al. |
| 6,323,249 | B1 | 11/2001 | Dale et al. |
| 2008/0051500 | A1 | 2/2008 | Wiese |
| 2008/0099715 | A1* | 5/2008 | Adams ............... C08K 3/32 252/62.54 |
| 2008/0237133 | A1 | 10/2008 | Dale et al. |
| 2010/0129794 | A1* | 5/2010 | Fabis ............... B01J 20/26 435/6.11 |
| 2010/0231433 | A1* | 9/2010 | Tishin ............... C04B 38/02 342/1 |
| 2010/0311850 | A1* | 12/2010 | Wickert ............. B01D 15/00 521/61 |

FOREIGN PATENT DOCUMENTS

| | | | |
|---|---|---|---|
| JP | H10505118 | A | 5/1998 |
| JP | 2009518489 | A | 5/2009 |
| WO | 1996007675 | A1 | 3/1996 |
| WO | 2003057739 | A1 | 7/2003 |
| WO | 2005090458 | A1 | 9/2005 |
| WO | 2009137889 | A1 | 11/2009 |
| WO | WO 2009137889 A1 * | 11/2009 | ........ A61K 9/0009 |
| WO | 2010082990 | A1 | 7/2010 |

OTHER PUBLICATIONS

Written Opinion of the International Searching Authority issued in corresponding International Patent Application No. PCT/AU2013/000956, dated Oct. 3, 2013, 5 pages He et al., "Functional Polymers and New Technology," Cross-Century Polymer Science. Chemical Industry & Press. pp. 21-27. Jan. 2001.

* cited by examiner

POLYMER BEADS INCORPORATING SOLID PARTICULATE MATERIAL

CROSS-REFERENCE TO RELATED APPLICATIONS

The present application is a U.S. National Stage entry under 35 U.S.C. § 371 of International Application No. PCT/AU2013/000956, filed on Aug. 28, 2013, designating the United States of America and published in English on Mar. 6, 2014, which in turn claims priority to Australian Application No. 2012903767, filed on Aug. 30, 2012, each of which is hereby incorporated by reference in its entirety.

FIELD OF THE INVENTION

The present invention relates in general to polymer beads incorporating solid particulate material, to a process for preparing the same, and to the application thereof. The polymer beads are particularly suitable for use in removing undesirable contaminants from water, and accordingly it will be convenient to describe the invention herein with reference to this application. However, it is to be understood that the polymer beads may also be used in other applications.

BACKGROUND OF THE INVENTION

Over large parts of the world, humans have inadequate access to potable water. Significant research has therefore been directed toward developing products and processes for removing contaminants from water to render it potable.

For example, polymer beads have been applied in the treatment of water contaminated with dissolved organic carbon (DOC). In that case, DOC within contaminated water can adsorb onto the surface of the polymer beads. The polymer beads may also be provided with ion exchange capacity to provide for what is commonly referred to in the art as an ion exchange resin. Providing the polymer beads with ion exchange capacity can enhance their contaminant removal efficiency.

In use, polymer beads, with or without ion exchange capacity, can be packed into a column and the contaminated water passed through the column for purification. However, this "packed column" approach to removing contaminants from water can be limited in its efficiency.

An alternative approach to applying the polymer beads, with or without ion exchange capacity, involves stirring polymer beads with the contaminated water in a tank. This approach allows the polymer beads to have maximum contact with the contaminated water. However, subsequent separation of the polymer beads (which are typically quite small) from the water can prove difficult.

Polymer beads having solid particulate material distributed therethrough can enhance the ease of their separation from water either by increasing the density of the polymer bead or by providing another property such as magnetic susceptibility that can be used to separate the polymer beads from the water.

WO 96/07675 discloses polymer beads incorporating solid particulate material. The polymer beads may be provided with ion exchange capacity, and were found to be effective at removing contaminants, such as DOC, from water.

Despite the existence of effective polymer beads suitable for use in removing contaminants from water, there remains an opportunity to develop new polymer bead technology that improves upon, or at least provides a useful alternative to, known polymer bead technology.

SUMMARY OF THE INVENTION

The present invention provides polymer beads comprising a polymeric matrix and having a pitted surface, the polymeric matrix (i) comprising polymerised monomer residues of (a) at least one mono-ethylenically unsaturated monomer, and (b) at least one crosslinking monomer having at least two ethylenically unsaturated groups separated by at least 4 consecutive acyclic atoms, and (ii) having distributed therethrough solid particulate material and polymeric porogen.

The present invention also provides a process for producing polymer beads (i) having a pitted surface, and (ii) incorporating within the beads polymeric matrix solid particulate material; said process comprising:
  (i) providing a dispersion having a dispersed phase and a continuous phase, the dispersed phase comprising:
    (a) polymerisable monomer composition,
    (b) solid particulate material, and
    (c) polymeric porogen;
    wherein the polymerisable monomer composition comprises;
    (a) at least one mono-ethylenically unsaturated monomer, and
    (b) at least one crosslinking monomer having at least two ethylenically unsaturated groups that are separated by at least 4 consecutive acyclic atoms; and
  (ii) polymerising the polymerisable monomer composition to form the polymeric matrix of the beads.

It has now been found that polymer beads having a pitted surface can be prepared using a dispersion polymerisation technique where the dispersed phase comprises a unique composition of polymerisable monomers, solid particulate material, and a polymeric porogen. The pitted surface of the polymer beads has been found to improve the beads ability to remove contaminants, such as DOC, from water.

Those skilled in the art will be familiar with the use of porogens in preparing polymer beads to impart porosity throughout the polymer matrix of the polymer beads. Surprisingly, use of the polymeric porogen in accordance with the present invention gives rise to a relatively low degree of porosity throughout the polymer beads, and instead promotes unexpected pitting on the surface of the polymer beads. Polymer beads having this pitted surface morphology have advantageously been shown to exhibit improved properties for removing contaminants, such as DOC, from water.

In one embodiment, the dispersed phase is an organic phase and the continuous phase is an aqueous phase.

In another embodiment, the polymer beads are provided with ion exchange capacity. In that case, the polymer beads are produced using a polymerisable monomer composition comprising one or more functional monomers having a functional group that provides, or upon reaction provides, the polymeric matrix of the beads with ion exchange sites.

In one embodiment, the at least one mono-ethylenically unsaturated monomer and/or the at least one crosslinking monomer are the functional monomers having a functional group that provides, or upon reaction provides, the ion exchange sites.

In another embodiment, the polymer beads have, or upon undergoing reaction provide, ion exchange capacity.

In a further embodiment, the polymeric matrix comprises polymerised monomer residue of one or more functional monomers having a functional group that provides, or upon reaction provides, ion exchange sites of the polymer beads.

In another embodiment, the polymerised monomer residue of the at least one mono-ethylenically unsaturated monomer and/or the at least one crosslinking monomer are the polymerised functional monomer residues.

The present invention also provides a method of treating an aqueous solution, the method comprising contacting said aqueous solution with polymer beads of, or prepared in accordance with, the present invention. Treatment of the aqueous solution may involve removing contaminants such as DOC.

The present invention further provides a method of separating ions from an aqueous solution, said method comprising contacting the solution with polymer beads having ion exchange capacity of, or prepared in accordance with, the present invention.

Further aspects and/or embodiments of the invention are described in more detail below.

BRIEF DESCRIPTION OF THE DRAWINGS

The invention will herein be described with reference to the following non-limiting drawings in which.

DETAILED DESCRIPTION OF THE INVENTION

Figure 1:
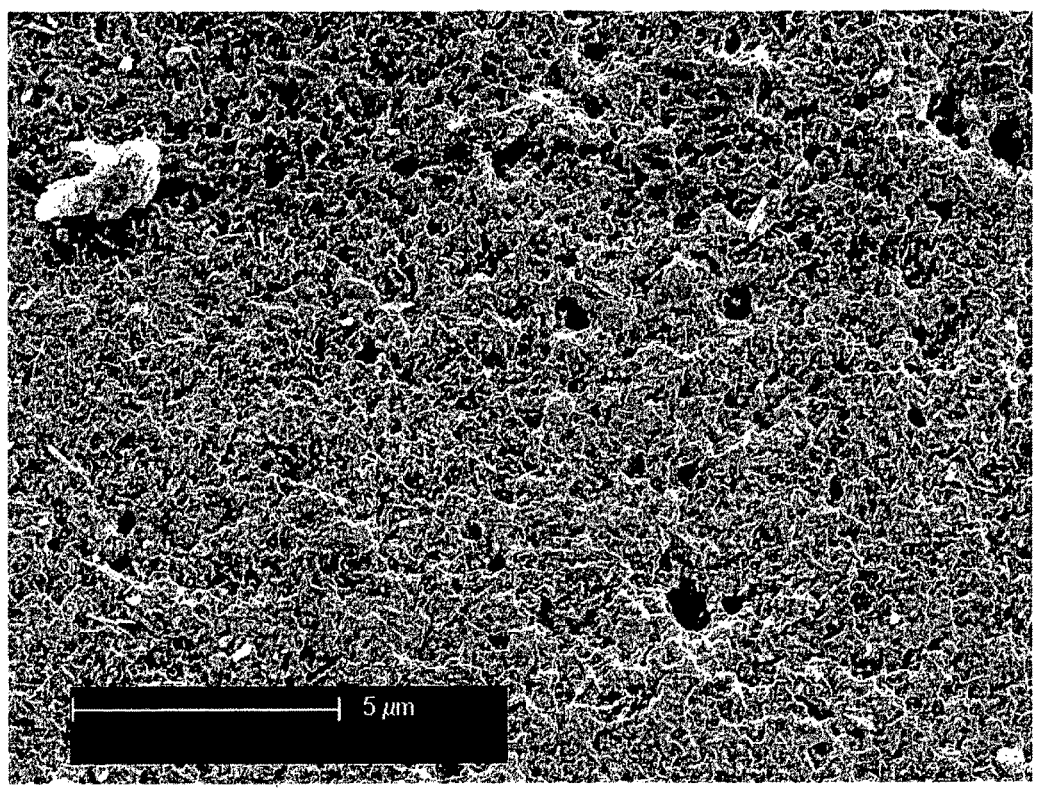
FIG. 1 illustrates the pitted surface of polymer beads of the invention prepared according to Example 1.

The polymer beads according to the invention have a pitted surface. By having a "pitted surface" is meant that the outermost surface of the polymer beads have indentations or depressions providing overall surface roughness. A pit is not intended to represent a pore of the polymer bead, the likes of which will typically extend a considerable distance within the polymer matrix of the bead and may in fact have no discernable end point. The term "pit" is therefore intended to define an indentation or depression on the surface of the polymer bead having a discernable depth. In other words a pit might be described as a crater on the surface of the polymer bead.

It is therefore the intention that the bottom of a given pit in the pitted surface of the polymer beads can be readily viewed, for example using microscopy techniques known in the art such as scanning electron microscopy (SEM).

The depth of a given pit in a pitted surface of polymer beads according to the invention can vary depending on the size of the beads but will generally be no more than about 5 microns, for example no more than about 4 microns, or no more than about 3 microns, or no more than about 2 microns, or no more than about 1 micron, or no more than about 500 nm, or no more than about 250 nm.

In one embodiment, the depth of a given pit in a pitted surface of polymer beads according to the invention may range from about 2 microns to about 100 nm, or from about 1 micron to about 100 nm.

The entire surface of the polymer beads will typically be substantially pitted. By "substantially pitted" is meant that the surface will not exhibit discernable smooth surface regions between pits (i.e. the pits are substantially adjacent each other).

The polymer beads in accordance with the invention incorporate solid particulate material. By the polymer beads "incorporating" solid particulate material is meant that the polymer beads are formed of a polymeric matrix and the solid particulate material is distributed throughout that polymeric matrix. As will be discussed in more detail below, the polymeric matrix of the polymer beads is formed from a polymerisable monomer composition and therefore comprises as part of its molecular structure polymerised monomer residues of that composition.

The process according to the invention involves providing a dispersion having a dispersed phase and a continuous phase. The dispersion may be prepared according to techniques well known in the art. For example, the dispersion may be prepared in a manner suitable for performing well known techniques of dispersion or suspension polymerisation.

Those skilled in the art will appreciate that in order to prevent the dispersed phase of the dispersion from coalescing it may be desirable to use a stabiliser. The type of stabiliser used will depend on the nature of both the dispersed and continuous phases. Suitable stabilisers that may be used to prevent the dispersed phase from coalescing include, but are not limited to, polyvinyl alcohol, gelatine, methyl cellulose, sodium polyacrylate, or combinations thereof.

The stabiliser is typically used in an amount of about 0.01 to about 5 wt %, for example from about 0.05 to about 2.0 wt %, based on the weight of the entire dispersion.

In one embodiment, the dispersed phase is an organic phase and the continuous phase is an aqueous phase. In that case, the process comprises providing a dispersion having a dispersed organic phase and a continuous aqueous phase.

The dispersed phase comprises polymerisable monomer composition. The polymerisable monomer composition itself comprises at least one mono-ethylenically unsaturated monomer.

By "mono-ethylenically unsaturated monomer" is meant monomer having a single double bond that is capable of being polymerised to form polymer. Suitable monomers are those which can be polymerised by free radical process. The monomers should also be capable of being polymerised with other monomers. Factors that determine copolymerisability of various monomers are well documented in the art. For example, see: Greenlee, R. Z., in Polymer Handbook 3$^{rd}$ Edition (Brandup, J., and Immergut. E. H. Eds) Wiley: New York, 1989 p II/53. Such monomers include those with the general formula (I):

where U and W are independently selected from —$CO_2H$, —$CO_2R^1$, —$COR^1$, —$CSR^1$, —$CSOR^1$, —$COSR^1$, —$CONH_2$, —$CONHR^1$, —$CONR^1_2$, hydrogen, halogen and optionally substituted $C_1$-$C_4$ alkyl or U and W form together a lactone, anhydride or imide ring that may itself be optionally substituted, where the optional substituents are independently selected from hydroxy, —CO$_2$H, —CO$_2$R$^1$, —COR$^1$, —CSR$^1$, —CSOR$^1$, —COSR$^1$, —CN, —CONH$_2$, —CONHR$^1$, —CONR$^1$$_2$, —OR$^1$, —SR$^1$, —O$_2$CR$^1$, —SCOR$^1$, and —OCSR$^1$;

V is selected from hydrogen, R$^1$, —CO$_2$H, —CO$_2$R$^1$, —COR$^1$, —CSR$^1$, —CSOR$^1$, —COSR$^1$, —CONH$_2$, —CONHR$^1$, —CONR$^1$$_2$, —OR$^1$, —SR$^1$, —O$_2$CR$^1$, —SCOR$^1$, and —OCSR$^1$;

where the or each R$^1$ is independently selected from optionally substituted alkyl, optionally substituted alkenyl, optionally substituted alkynyl, optionally substituted aryl, optionally substituted heteroaryl, optionally substituted carbocyclyl, optionally substituted heterocyclyl, optionally substituted arylalkyl, optionally substituted heteroarylalkyl, optionally substituted alkylaryl, optionally substituted alkylheteroaryl, and an optionally substituted polymer chain.

The or each R$^1$ may also be independently selected from optionally substituted C$_1$-C$_{22}$ alkyl, optionally substituted C$_2$-C$_{22}$ alkenyl, optionally substituted C$_2$-C$_{22}$ alkynyl, optionally substituted C$_6$-C$_{18}$ aryl, optionally substituted C$_3$-C$_{18}$ heteroaryl, optionally substituted C$_3$-C$_{18}$ carbocyclyl, optionally substituted C$_2$-C$_{18}$ heterocyclyl, optionally substituted C$_7$-C$_{24}$ arylalkyl, optionally substituted C$_4$-C$_{18}$ heteroarylalkyl, optionally substituted C$_7$-C$_{24}$ alkylaryl, optionally substituted C$_4$-C$_{18}$ alkylheteroaryl, and an optionally substituted polymer chain. Examples polymer chains include those selected from polyalkylene oxide, polyarylene ether and polyalkylene ether.

In one embodiment, R$^1$ may be independently selected from optionally substituted C$_1$-C$_6$ alkyl.

Examples of such monomers include, but are not limited to, maleic anhydride, N-alkylmaleimide, N-arylmaleimide, dialkyl fumarate and cyclopolymerisable monomers, acrylate and methacrylate esters, acrylic and methacrylic acid, styrene, acrylamide, methacrylamide, and methacrylonitrile, mixtures of these monomers, and mixtures of these monomers with other monomers.

Other examples of useful ethylenically unsaturated monomers include the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylamino styrene (all isomers), alpha-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropylacrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl pyridine, vinyl acetate, vinyl butyrate, vinyl benzoate, maleic anhydride, N-phenylmaleimide, N-butylmaleimide, N-vinylpyrrolidone, and N-vinylcarbazole. This list is not exhaustive.

The polymerisable monomer composition further comprises at least one crosslinking monomer having at least two ethylenically unsaturated groups. Each of the at least two ethylenically unsaturated groups of the crosslinking monomer are of course to be capable of undergoing polymerisation. By having two polymerisable ethylenically unsaturated groups those skilled in the art will appreciate that the crosslinking monomer will provide for crosslinking points within the polymeric matrix of the polymer beads.

In one embodiment, the crosslinking monomer has at least three ethylenically unsaturated groups. Each of these three ethylenically unsaturated groups is also to be polymerisable.

An important feature of the crosslinking monomers used in accordance with the invention is that the at least two ethylenically unsaturated groups are separated by at least 4 consecutive acyclic atoms. Where the crosslinking monomer has at least three ethylenically unsaturated groups, each of the at least three ethylenically unsaturated groups are separated at least by 4 consecutive acyclic atoms.

By the ethylenically unsaturated groups being separated by at least "4 consecutive acyclic atoms" is meant that in the atom connectivity between the ethylenically unsaturated groups there must be at least 4 acyclic atoms sequentially connected in series. By an "acyclic atom" is meant an atom that does not form part of a ring structure. There is no particular limitation regarding the nature of the acyclic atoms. For example, the consecutive acyclic atoms may include a carbon atom, a nitrogen atom, an oxygen atom, or a combination thereof.

Without wishing to be limited by theory, it is believed that crosslinking monomers having the structural features defined herein play an important role in enabling the so formed polymer beads to develop a pitted surface.

Further detail in relation to the role of the crosslinking monomer is provided below.

In one embodiment, the at least two ethylenically unsaturated groups are separated by at least 5, or at least 6, or at least 7 acyclic atoms.

Where the crosslinking monomer comprises at least 3 ethylenically unsaturated groups, the at least three ethylenically unsaturated groups are each separated by at least 4, or at least 5, or at least 6, or at least 7 acyclic atoms.

In a further embodiment, the crosslinking monomer is an acyclic crosslinking monomer.

Examples of suitable crosslinking monomers having at least 2 ethylenically unsaturated groups include, but are not limited to, ethylene glycol dimethacrylate, poly(ethylene glycol)dimethacrylate, methylene bisacrylamide, triethylene glycol diacrylate and triethylene glycol dimethacrylate, ethylene glycol diacrylate and ethylene glycol dimethacrylate, diethylene glycol diacrylate and diethylene glycol dimethacrylate, glycerol diacrylate and glycerol dimethacrylate, 1,3-butanediol diacrylate and 1,3-butanediol dimethacrylate, 1,3-propanediol diacrylate and 1,3-propanediol dimethacrylate, 1,3-pentanediol diacrylate and 1,3-pentanediol dimethacrylate, 1,4-butanediol diacrylate and 1,4-butanediol dimethacrylate, hexamethylene glycol diacrylate and hexamethylene glycol dimethacrylate, decamethylene glycol diacrylate and decamethylene glycol dimethacrylate, 2,2-dimethylolpropane diacrylate and 2,2-dimethylolpropane dimethacrylate, tripropylene glycol diacrylate and tripropylene glycol dimethacrylate, 2,2-di(p-hydroxyphenyl)propane diacrylate and 2,2-di(p-hydroxyphenyl)propane dimethacrylate, 2,2,4-trimethyl-1,3-pentanediol diacrylate and 2,2,4-trimethyl-1,3-pentanediol dimethacrylate, tetraethylene glycol diacrylate, tetraethylene glycol dimethacrylate, and combinations thereof.

Suitable crosslinking monomers having at least three ethylenically unsaturated groups include, but are not limited to, trimethylolpropane triacrylate, trimethylolpropane trimethacrylate, pentaerythritol triacrylate, pentaerythritol trimethacrylate, glycerol triacrylate, glycerol trimethacrylate, pentaerythritol tetraacrylate, pentaerythritol tetramethacrylate, tris(2-hydroxy ethyl)isocyanurate triacrylate, ethoxylated trimethylolpropane triacrylate, ethoxylated trimethylolpropane trimethacrylate, propoxylated trimethylolpropane triacrylate, propoxylated trimethylolpropane trimethacrylate, ethoxylated glycerol triacrylate, ethoxylated glycerol trimethacrylate, propoxylated glycerol triacrylate, propoxylated glycerol trimethacrylate, ethoxylated pentaerythritol triacrylate, ethoxylated pentaerythritol trimethacrylate, propoxylated pentaerythritol triacrylate, propoxylated pentaerythritol trimethacrylate, ethoxylated pentaerythritol tetraacrylate, ethoxylated pentaerythritol tetramethacrylate, propoxylated pentaerythritol tetraacrylate, propoxylated pentaerythritol tetramethacrylate, and combinations thereof.

Suitable crosslinking monomers having at least three ethylenically unsaturated groups also include, but are not limited to, ethoxylated (3, 6, 9, 12, 15, 18, or 20) trimethylolpropane triacrylate, ethoxylated (3, 6, 9, 12, 15, 18, or 20) trimethylolpropane trimethacrylate, propoxylated (3, 6, 9, 12, 15, 18, or 20) trimethylolpropane triacrylate, propoxylated (3, 6, 9, 12, 15, 18, or 20) trimethylolpropane trimethacrylate, ethoxylated (3, 6, 9, 12, 15, 18, or 20) glycerol triacrylate, ethoxylated (3, 6, 9, 12, 15, 18, or 20) glycerol trimethacrylate, propoxylated (3, 6, 9, 12, 15, 18, or 20) glycerol triacrylate, propoxylated (3, 6, 9, 12, 15, 18, or 20) glycerol trimethacrylate, ethoxylated (3, 6, 9, 12, 15, 18, or 20) pentaerythritol triacrylate, ethoxylated (3, 6, 9, 12, 15, 18, or 20) pentaerythritol trimethacrylate, propoxylated (3, 6, 9, 12, 15, 18, or 20) pentaerythritol triacrylate, propoxylated (3, 6, 9, 12, 15, 18, or 20) pentaerythritol trimethacrylate, ethoxylated (4, 5, 8, or 16) pentaerythritol tetraacrylate, ethoxylated (4, 5, 8, or 16) pentaerythritol tetramethacrylate, propoxylated (4, 5, 8, or 16) pentaerythritol tetraacrylate, propoxylated (4, 5, 8, or 16) pentaerythritol tetramethacrylate, and combinations thereof.

By way of further explanation of the type of crosslinking monomers suitable for use in accordance with the invention, it will be convenient to compare the crosslinking monomers trimethylolpropane triacrylate and divinylbenzene. Thus, trimethylolpropane triacrylate has three ethylenically unsaturated groups that are each separated by 7 acyclic atoms. In contrast, divinylbenzene is a crosslinking monomer having two ethylenically unsaturated groups separated only by cyclic atoms. Accordingly, a crosslinking monomer such as divinylbenzene falls outside the scope of crosslinking monomers suitable for use in accordance with the invention. As will be discussed in more detail below, crosslinking monomers such as divinylbenzene are believed to adversely effect the ability to form a pitted surface of the polymer beads.

In one embodiment, the polymerisable monomer composition used in accordance with the process of the invention does not comprise divinylbenzene. Correspondingly, in another embodiment the polymeric matrix of the polymer beads according to the invention does not comprise or incorporate polymerised monomer residues of divinylbenzene.

In addition to the polymerisable monomer composition, the dispersed phase also comprises solid particulate material.

In one embodiment, the solid particulate material is of a type that results in the polymer beads having a higher density than they otherwise would have in the absence of the solid particulate material. By providing the polymer beads with an increased density, their settling time can advantageously be decreased which allows for simpler separation of the polymer beads from a water sample being treated. In that case, the solid particulate material may be described as a weighting agent and assisting promoting rapid settling of the polymer beads.

According to such an embodiment, the solid particulate material used will generally be a material that has a higher density than the density of the polymer beads in the absence of the solid particulate material. The solid particulate material will typically be insoluble in any of the liquids used in preparing the polymer beads, and typically also insoluble in any liquid that the resulting polymer beads may contact.

Examples of suitable solid particulate material include, but are not limited to, titania, zirconia, barite, cassiterite, silica, aluminosilicates, nickel oxide, copper oxide, zinc oxide, zinc sulphide, and other oxides, sulphides, sulphates, carbonates of heavy metals.

In one embodiment, the solid particulate material is a magnetic material.

As used herein, the term "magnetic" is intended to denote a property of a substance that enables it to be temporarily or permanently magnetised, and therefore includes the property of being paramagnetic. Accordingly, reference to a "magnetic particle" or a "magnetic solid particulate material" implies that this substance is of least capable of being magnetised, if not already in a magnetised state.

Incorporation of solid magnetic particulate material into the polymer beads can advantageously enable them to be used in applications involving continuous flows of water to be treated. In the absence of any applied sheer, attraction between the magnetic particles in the polymer beads causes them to flocculate and settle rapidly, enabling the beads to be readily separated under more demanding process conditions.

To render the polymer beads magnetic, the dispersed phase may include any solid particulate material that is magnetic. Examples of such material include, but are not limited to, γ-iron oxide (γ-$Fe_2O_3$, also known as maghemite), magnetite ($Fe_3O_4$), chromium dioxide, other metal oxides and more exotic magnetic materials, such as those based on neodymium or samarium and other rare earth materials, for example samarium-cobalt or neodymium iron boride. Maghemite is preferred because it is inexpensive. The magnetic particles may be included in the dispersed phase in a form that may or may not be magnetised.

Suitable paramagnetic materials include, but are not limited to, iron bearing minerals such as montmorillonite, nontronite, biotite, siderite and pyrite, aluminium and copper.

The particle size of the solid particulate material may range in size that is up to about one-tenth of the particle size of the polymer beads formed during the process. Solid particles that are larger than this may be difficult to evenly disperse throughout the polymer beads. More preferably, the solid particles range in size from sub-micron (e.g. 0.1 µm) to about 50 µm, for example from about 0.05 µm to about 10 µm, or from about 0.05 µm to 5 µm, or from about 0.05 µm to 1 µm.

It may also be necessary to employ a dispersing agent for dispersing the solid particulate material in the dispersed phase. The dispersing agent acts to disperse the particles in the droplets of the dispersed phase to thereby form a stable dispersion (or suspension) of the particles in the dispersed phase. The dispersing agent also acts to promote a substantially even distribution of particles throughout the resultant polymer beads. By distributing the particles in this manner, the problem of erosion of the particles from the polymer beads in service, as may happen if the particles were located only on the outer surface of the beads is avoided, or at least alleviated.

In one embodiment the dispersed phase therefore further comprises a dispersing agent for dispersing the solid particulate material throughout the dispersed phase. Correspondingly, in a further embodiment the polymeric matrix of the polymer beads has distributed therethrough dispersing agent.

Suitable dispersing agents for dispersing the solid particulate material will generally have a good binding affinity toward the surface of the particles and preferably should be able to chemically or physically bond to the surface of the particles. The dispersing agent will also generally be compatible with or soluble in the polymerisable monomer composition.

In one embodiment, the dispersing agent reacts with monomer of the polymerisable monomer composition to become covalently bound thereto. Correspondingly, in a further embodiment the polymeric matrix of the polymer beads has dispersing agent covalently bound thereto. In that case, the dispersing agent will not be merely distributed throughout the polymeric matrix but rather will form part of the polymeric matrix.

Use of a dispersing agent that forms a covalent bond with the polymeric matrix not only results in a substantially even distribution of particles throughout the polymer bead, but the particles also advantageously become more effectively bound within the bead through the dispersing agent being covalently bound to the polymer matrix. In that case, the problem of leaching of the particles from the polymer beads can be avoided, or at least alleviated.

Selection of the dispersing agent will typically depend upon the particular particulate material and polymerisable monomer composition being used. Those skilled in the art should be able to readily select a suitable dispersing agent having regard to the specific reagents used in preparing the beads.

Examples of suitable dispersing agents for dispersing the solid particulate material in the dispersed phase include, but are not limited to, an amine block co-polymer such as that sold under the tradename Disperbyk® 162, Disperbyk163, Disperbyk 164, Disperbyk 166 and Disperbyk 167 by Byk Chemie. Other suitable dispersants including Solsperse 20000, Solsperse 24000, Solsperse 32000, Solsperse 38500, Solsperse 46000 from Lubirzol. Teric®305 and Alkanate®40PF sold by Huntsman, Crafol® AP12, AP60 and AP69 sold by Cognis, Disponil® AEP8100 and AEP5300 sold by Henkel, and Rhodafac® and PE501® sold by Rhodia.

The solid particulate material will generally be added in an amount of from 10 to 300 wt %, based on the weight of the polymerisable monomer composition, for example from 20 to 100 wt % (same basis). When present, the dispersing agent used to disperse the solid particulate material in the dispersed phase will generally be added in an amount of from 0.1 to 30 wt %, for example in an amount of from 1 to 10 wt %, based on the weight of solid particulate material.

The dispersed phase further comprises a polymeric porogen. Porogens, such as polymeric porogens, are typically used in the art to impart internal macroporosity. Promoting such internal porosity of polymer beads is a common way of increasing the total surface area of the beads, which in turn has been found to improve the efficiency of the beads in removing certain contaminants from water.

Surprisingly, it is now being found that the use of a polymeric porogen in combination with other components in the dispersed phase promotes relatively poor internal porosity of the polymer beads, and instead promotes excellent surface pitting of the polymer beads. Without wishing to be limited by theory, the surface pitting effect provided by the polymeric porogen is believed to at least in part stem from the type of crosslinking monomer, employed. In particular, crosslinking monomers used in accordance with the invention have ethylenically unsaturated groups separated by at least 4 consecutive acyclic atoms. Having the ethylenically unsaturated groups separated in this way is believed to provide a crosslinked polymeric matrix with sufficient flexibility to enable polymeric porogen trapped in the polymeric matrix at least at the surface of the polymer beads to be released or washed away. Loss of the polymeric porogen at the surface of the polymer beads is in turn believed to provide for the pitted surface.

Polymeric porogen within the internal regions of the polymer beads is believed to have a relatively limited ability to be released and consequently the polymer beads exhibit a relatively low level of internal porosity. Polymer beads according to the invention therefore retain permanently trapped polymeric porogen within the polymeric matrix.

As a case in point, it has been found that using divinylbenzene to prepare the polymer beads instead of a crosslinking agent of the type used in accordance with the invention provides for a beads surface that is quite smooth and does not exhibit the degree of pitting of polymer beads according to the invention.

Examples of suitable polymeric porogens that may be used in accordance with the invention include, but are not limited to, poly(vinyl methyl ether), poly(ethylene oxide), poly(vinyl acetate), poly(methyl methacrylates), poly(vinyl acetate co-maleic or fumric acid and esters), fatty alcohol ethoxylates, fatty alcohol alkoxylates, alcohol alkoxylates, fatty acid athoxylates, castor oil ethoxylates, fatty amine ethoxylates, alkylphenol ethoxylates, alkyl ethoxy carboxylic acids, and combinations thereof.

The polymeric porogen will generally be used in an amount ranging from about 5 wt % to about 50 wt %, or in an amount ranging from about 10 wt % to about 40 wt %, or in an amount ranging from about 15 wt % to about 40 wt %, relative to the total amount of polymeric porogen and monomer used.

The polymeric porogen may be used in conjunction with one or more other porogens (i.e. non-polymeric porogens).

While there is no particular limitation regarding the amount of polymeric porogen that is to be used relative to other porogens, it must be used in a sufficient amount to impart the required surface pitting. Generally, the polymeric porogen will be used in an amount of at least 5 wt. %, or at least 10 wt. %, or at least 15 wt. %, or at least 20 wt. %, or at least 25 wt. %, relative to the total amount of porogen used.

Examples of non-polymeric porogens include aromatic compounds such as toluene and benzene, alcohols such as butanol, iso-octanol, cyclohexanol, dodecanol, isoamyl alcohol, tertiary amyl alcohol and methyl iso-butyl carbinol, esters such as ethyl acetate and butyl acetate, saturated hydrocarbons such as n-heptane, iso-octane, halogenated solvents such as dichloroethane and trichloroethylene, and plasticisers such as dioctylphthalate and dibutyl adipate.

In one embodiment, the polymeric porogen will be used in an amount ranging from 5-100 wt %, or from 10-100 wt %, or from 15-100 wt %, or from 20-100 wt %, or from 25-100 wt %, or from 35-100 wt %, or from 45-100 wt %, or from 55-100 wt %, or from 65-100 wt %, or from 75-100 wt %, or from 80-100 wt %, or from 85-100 wt %, or from 90-100 wt %, relative to the total amount of porogen used.

The components in dispersed phase typically form an intimate mixture. In other words, at least the polymerisable monomer composition, the solid particulate material and the polymeric porogen are well mixed.

After providing the dispersion, the process of the invention involves polymerising the polymerisable monomer composition to form the polymer beads. The polymerisation may require the presence of a radical initiator to initiate reaction of the monomers. In that case, a free radical initiator can also be included in the dispersed phase. Those skilled in the art will appreciate that the initiator to be used will depend upon the nature of the polymerisable monomers present. By way of example only, suitable initiators include azoisobutyronitrile, benzoyl peroxide, lauroyl peroxide and t-butyl hydroperoxide.

The amount of initiator used is generally in the range of 0.01 to 5 wt %, more preferably 0.10 to 1%, calculated on the total weight of polymerisable monomers present.

The process of the invention may be performed using conventional suspension polymerisation techniques. In that case, the dispersion of the dispersed phase (which includes the monomers to be polymerised) in the continuous phase is typically achieved by mixing, for example, the organic and aqueous phases and shearing the resulting mixture. The shear applied to the dispersion can be adjusted to control the size of the droplets of the dispersed phase. As the droplets of the dispersed phase are polymerised to produce the polymer beads, the shear applied to the dispersion largely controls the particle size of the polymer beads.

Generally, the polymer beads are controlled to have a particle size within the range of about 10 to about 500 micron, or for example within the range of about 30 to about 1,000 micron, or within the range of about 100 to about 300 micron.

Once a stable dispersion of the dispersed phase in the continuous phase is established, the polymerisation reaction may be initiated by heating the dispersion to a desired reaction temperature. The dispersion may be held at the desired reaction temperature until the polymerisation reaction is substantially complete.

In conducting the polymerisation reaction, the monomers will typically be selected to provide polymer beads that are suited to a desired application. For example, depending upon the monomers used, the resulting polymer beads may include acid or amine groups that can enable the polymer beads to function as an ion exchange resin, with these functional groups being directly provided by the polymerised residues of one or more functional monomers.

Functional monomers capable of directly introducing amine functionality to the beads include, but are not limited to, dimethylaminoethyl methacrylate, aminopropyl acrylamide and methacrylamide, N,N-dimethylaminopropyl acrylamide and methacrylamide, vinyl pyridine, and organic-soluble diallylamine or vinylimidazole salts.

Functional monomers capable of directly introducing acid functionality to the beads include, but are not limited to, acrylic acid, methacrylic acid and ethacrylic acid.

Alternatively, once the polymerisation is complete, the resulting polymer beads may require subsequent treatment to provide functional groups that will enable the polymer beads to function as an ion exchange resin. The particular treatment process used will be dependent on the composition of the polymer beads to be treated. The treatment process may involve reacting the polymer beads with one or more compounds that convert functional groups present on the beads into ion exchange groups, or reacting functional groups on the beads with one or more compounds that introduce ion exchange groups to the beads.

In a treatment process where functional groups on the beads are converted into ion exchange groups, the functional groups may be converted into amine or acid groups, or salts thereof, or quaternary ammonium groups. Various combinations of suitable functional groups and reactants may be employed for this purpose, the nature of which would be known to those skilled in the art. In that case, it is preferable that the functional groups on the beads are amide or ester groups, and that the amide or ester groups are introduced to the polymer beads by way of an amide or ester functional monomer.

Exemplary amide functional monomers include, but are not limited to, N-vinyl formamide or N-methyl-N-vinyl acetamide. Amide groups can be readily converted to amine groups by hydrolysis, Hofmann degradation or borohydride reduction. Hydrolysis is a preferred technique. For example, amide groups in N-vinylformamide or N-methyl-N-vinylacetamide monomer units can be converted to amine groups by hydrolysis. Amine groups can be readily converted into a salt or quaternary ammonium group.

Exemplary ester functional monomers include, but are not limited to, methyl-, ethyl-, or butyl acrylate. Ester groups can be readily converted to weak acid groups by hydrolysis. For example, ester groups in methyl-, ethyl-, or butyl acrylate monomer units can be converted to weak acid groups by hydrolysis.

In a process where functional groups on the beads are reacted with one or more compounds which contain functional groups that introduce ion exchange groups to the beads, the one or more compounds preferably introduce amine or quaternary ammonium groups. Various combinations of suitable functional groups and reacting compounds may be employed for this purpose, the nature of which would be known to those skilled in the art. In that case, functional groups on the beads may include, but are not limited to, halogens, epoxides, esters and amides. Such functional groups may be introduced to the polymer beads by way of appropriate functional monomers. Exemplary functional monomers for this purpose include, but are not limited to, vinyl benzyl chloride, glycidyl methacrylate, acrylate or methacrylate esters or amides (as defined above). Such functional groups can be reacted with compounds that introduce amine or quaternary ammonium groups. Suitable reactant compounds include, but are not limited to, amines, diamines, and polyamine compounds and their respective salts. Preferred compounds for introducing amine or quaternary ammonium groups include, but are not limited to, piperidine, N,N-diethylethylene diamine, dimethylamine, diethylamine, trimethylamine, triethylamine, 3-dimethylaminopropylamine, ethylenediamine, diethylenetriamine, polyethyleneimine and their respective salts.

The pitted surface of the polymer beads in accordance with the invention is believed to be formed during the polymerisation process. After polymerisation is complete some polymeric porogen may remain within the pitted regions on the surface of the polymeric beads. To facilitate removal of polymeric porogen residues and other reaction residues from the polymer beads it may be desired to subject the beads to a cleaning process. This may be achieved by a sequence of washing steps and/or by steam stripping the beads.

One method for cleaning the polymer beads includes the following steps:
(a) add reaction product to a large excess of water, stir and allow to settle;
(b) separate beads from the supernatant;
(c) add separated beads to a large excess of water, stir and allow to settle before separating beads from the supernatant;
(d) repeat step (c) several times;
(e) optionally disperse water washed beads in alcohol (ethanol);
(f) separate beads from alcohol and dry.

Alternatively, the polymer beads may be first subjected to steam stripping and then washed as outlined above.

Polymer beads according to the invention comprise a polymeric matrix and have a pitted surface, the polymeric matrix (i) comprising polymerised monomer residues of (a) at least one mono-ethylenically unsaturated monomer, and (b) at least one crosslinking monomer having at least two ethylenically unsaturated groups separated by at least 4 consecutive acyclic atoms, and (ii) having distributed therethrough solid particulate material and polymeric porogen.

For avoidance of any doubt, by the polymer matrix comprising the "polymerised monomer residues" is meant that the specified monomers have been polymerised to form the polymer matrix and therefore the polymerised monomer residues make up at least a part of the molecular structure of the matrix. In other words, the polymeric matrix (i) presents as at least part of its molecular structure polymerised monomer residues of (a) at least one mono-ethylenically unsaturated monomer, and (b) at least one crosslinking monomer having at least two ethylenically unsaturated groups separated by at least 4 consecutive acyclic atoms.

Accordingly, polymer beads according to the invention are formed of a polymeric matrix and have a pitted surface, the polymeric matrix itself (i) presenting as part of its molecular structure polymerised monomer residues of (a) at least one mono-ethylenically unsaturated monomer, and (b) at least one crosslinking monomer having at least two ethylenically unsaturated groups separated by at least 4 consecutive acyclic atoms, and (ii) having distributed therethrough solid particulate material and polymeric porogen.

In one embodiment, the polymer beads have, or upon undergoing reaction provide, ion exchange capacity. In that case, the polymeric matrix comprises (or is formed from) polymerised monomer residue of one or more functional monomers having a functional group that provides, or upon reaction provides, ion exchange sites of the polymer beads.

The polymerised monomer residue of one or more functional monomers may in fact be the polymerised monomer residue of the at least one mono-ethylenically unsaturated monomer and/or the at least one crosslinking monomer.

The present invention also provides a method of treating an aqueous solution (e.g. water), the method comprising contacting said aqueous solution with polymer beads of, or prepared in accordance with, the present invention. Treatment of the aqueous solution may involve removing contaminants such as DOC. In that case, DOC becomes adsorbed to the surface of the polymer beads and removal of the polymer beads from the aqueous solution also results in DOC being removed from the aqueous solution.

The present invention further provides a method of separating ions from an aqueous solution, said method comprising contacting the solution with polymer beads having ion exchange capacity of, or prepared in accordance with, the present invention. In that case, ions become adsorbed to the surface of the polymer beads and removal of the polymer beads from the aqueous solution also results in ions being separated from the aqueous solution.

The polymer beads, together with the adsorbed contaminants/ions can readily be separated from the aqueous solution thereby leaving purified aqueous solution. As the polymer beads contain solid particulate material, their separation from the aqueous solution can be facilitated by, for example, the beads having an increased density that allows for more rapid settling. Alternatively, the polymer beads may contain magnetic solid particulate material and they can be separated from solution using the beads' magnetic properties. For example, in the absence of sheer, the beads can aggregate through magnetic attraction and settle out of the purified solution. Alternatively, they can be separated on a wet high intensity magnetic separator or magnetic drum separator or similar device.

Examples of anions that may be separated from the aqueous solution include, but are not limited to, dissolved organics such as humates and fulvates, chromate, arsenate, arsenita, selenate, selenite, phosphate, perchlorate, nitrate and dissolved organic nitrogen.

Examples of cations that may be separated from the aqueous solution, include, but are not limited to, transition metal ions such as cadmium and zinc, and also metal ions such as calcium and magnesium.

The polymer beads in accordance with the invention are particularly suitable for use in removing DOC from an aqueous solution. Surprisingly, the polymer beads exhibit an excellent ability to remove from an aqueous solution DOC having a molecular weight above about 2000 Dalton.

The invention therefore also provides a method of removing DOC from an aqueous solution, the method comprising (i) contacting said aqueous solution with polymer beads of, or prepared in accordance with, the present invention, and (ii) removing polymer beads with DOC adsorbed thereon from the aqueous solution to thereby remove DOC from the aqueous solution.

The invention therefore also a method of removing ions from an aqueous solution, said method comprising (i) contacting said aqueous solution with ion exchange polymer beads of, or prepared in accordance with, the present invention, and (ii) removing from the solution polymer beads that have undergone ion exchange with the ions to be removed.

The term "alkyl" includes saturated aliphatic groups, including straight-chain alkyl groups (e.g., methyl, ethyl, propyl, butyl, pentyl, hexyl, heptyl, octyl, nonyl, decyl, etc.) and branched-chain alkyl groups (isopropyl, tert-butyl, isobutyl, etc.). In some embodiments "alkyl" refers to straight chained alkyl. The expression "$C_{x-y}$alkyl", wherein x is 1-5 and y is 2-12 indicates an alkyl group (straight- or branched-chain) containing the specified number of carbon atoms. For example, the expression $C_{1-2}$alkyl includes, but is not limited to, methyl, ethyl, propyl, butyl, isopropyl, tert-butyl and isobutyl. The term "alkylene" refers to a divalent alkyl group.

In one embodiment, a straight chain or branched chain alkyl has 12 or fewer carbon atoms (i.e. $C_{1-12}$). In some embodiments a straight chain or branched chain alkyl has 8 or fewer carbon atoms (i.e. $C_{1-8}$).

The term "alkenyl" includes unsaturated aliphatic groups analogous in length and possible substitution to the alkyls described above, but which contain at least one double bond. For example, the term "alkenyl" includes straight-chain alkenyl groups (e.g., ethenyl, propenyl, butenyl, pentenyl, hexenyl, heptenyl, octenyl, nonenyl, decenyl, etc.) and branched-chain alkenyl groups. In some embodiments "alkenyl" refers to straight chained alkenyl. In certain embodiments, a straight chain or branched chain alkenyl group has 12 or fewer carbon atoms in its backbone (e.g., $C_2$-$C_{12}$ for straight chain, $C_3$-$C_{12}$ for branched chain). The term $C_2$-$C_{12}$ includes alkenyl groups containing 2 to 12 carbon atoms. The term "alkenylene" refers to a divalent alkenyl group.

The term "alkynyl" includes unsaturated aliphatic groups analogous in length and possible substitution to the alkyls described above, but which contain at least one triple bond. For example, the term "alkynyl" includes straight-chain alkynyl groups (e.g., ethynyl, propynyl, butynyl, pentynyl, hexynyl, heptynyl, octynyl, nonynyl, decynyl, etc.) and branched-chain alkynyl groups. In some embodiments "alkynyl" refers to straight chained alkynyl. In certain embodiments, a straight chain or branched chain alkynyl group has 12 or fewer carbon atoms in its backbone (e.g., $C_2$-$C_{12}$ for straight chain, $C_2$-$C_{12}$ for branched chain). The term $C_2$-$C_{12}$ includes alkynyl groups containing 2 to 12 carbon atoms. The term "alkynylene" refers to a divalent alkynyl group.

The term "carbocyclyl" includes any of non-aromatic monocyclic, polycyclic, fused or conjugated hydrocarbon residues, preferably $C_{3-20}$ (e.g. $C_{3-10}$ or $C_{3-8}$). The rings may be saturated, e.g. cycloalkyl, or may possess one or more double bonds (cycloalkenyl) and/or one or more triple bonds (cycloalkynyl). Particularly preferred carbocyclyl moieties are 5-, 6-membered or 9-10 membered ring systems. Suitable examples include cyclopropyl, cyclobutyl, cyclopentyl, cyclohexyl, cycloheptyl, cyclooctyl, cyclononyl, cyclodecyl, cyclopentenyl, cyclohexenyl, cyclooctenyl, cyclopentadienyl, cyclohexadienyl, cyclooctatetraenyl, indanyl, decalinyl and indenyl. A carbocyclyl group may be optionally substituted by one or more optional substituents as herein defined. The term "carbocyclylene" is intended to denote the divalent form of carbocyclyl. The term "cycloalkyl" includes saturated cyclic aliphatic groups (cyclopropyl, cyclopentyl, cyclohexyl, cycloheptyl, cyclooctyl). The term $C_{3-6}$cycloalkyl includes, but is not limited to, cyclopropyl, cyclopentyl, and cyclohexyl. Likewise, preferred cycloalkyls have from 4-7 carbon atoms in their ring structure, and more preferably have 5 or 6 carbons in the ring structure. As used herein the term "heterocycloalkyl" refers to a cycloalkyl group containing one or more endocyclic heteroatoms. Likewise, cycloalkenyl groups may have from 3-8 carbon atoms in their ring structure, and more preferably have 5 or 6 carbons in the ring structure.

The term "heteroatom" includes atoms of any element other than carbon or hydrogen. Preferred heteroatoms are nitrogen, oxygen, sulfur and phosphorus. Particularly preferred heteroatoms are nitrogen and oxygen.

The term "amine" or "amino" should be understood as being broadly applied to both a molecule, or a moiety or functional group, as generally understood in the art, and may be primary, secondary, or tertiary. The term "amine" or "amino" includes compounds where a nitrogen atom is covalently bonded to at least one carbon or hydrogen.

As used herein, the term "optionally substituted" typically refers to where a hydrogen atom on a group has been substituted with a non-hydrogen group. Unless the context requires otherwise, such as where the optional substituent has been explicitly referred to, examples of optional substituents are detailed below. Any optionally substituted group may bear one, two, three or more optional substituents.

In some embodiments the optional substituents are selected from: optionally substituted $C_{1-6}$alkyl; optionally substituted $C_{6-10}$aryl; halogen; —OH; —NH$_2$; —NO$_2$; —SO$_2$NH$_2$; —COOH; —COO($C_{1-6}$alkyl); —NHCOO($C_{1-6}$alkyl); —NH—COR$^a$ wherein R$^a$ is H or $C_{1-6}$alkyl; —NR$^a$R$^b$ wherein R$^a$ is H or $C_{1-6}$alkyl and R$^b$ is H or $C_{1-6}$alkyl; —C(O)NR$^a$R$^b$, wherein R$^a$ is H or $C_{1-6}$alkyl and R$^b$ is H, $C_{1-6}$alkyl; —C(O)R$^a$ wherein R$^a$ is H or $C_{1-6}$alkyl; or —Y-Q, wherein:

Y is selected from: —O—, —NH—, —N($C_{1-6}$alkyl)-, —NHSO$_2$—, —SO$_2$NH—, —NHCONH—, —NHCON($C_{1-6}$alkyl)-, —S(O)$_q$— wherein q is 0, 1 or 2, —C(O)NH—, —C(O)N(CH$_3$)—, —NHC(O)—, —C(O)—, —NHC(NH)NH—, or absent, and Q is selected from: optionally substituted $C_{6-10}$aryl; optionally substituted 5-10 membered $C_{1-9}$heteroaryl; optionally substituted 3-10 membered $C_{1-9}$heterocyclyl; optionally substituted $C_{3-10}$cycloalkyl; optionally substituted $C_{1-6}$alkyl; optionally substituted $C_{1-6}$alkylacyl; optionally substituted $C_{2-6}$alkenyl; optionally substituted $C_{2-6}$alkynyl; and hydrogen.

In other embodiments the optional substituents are selected from: optionally substituted $C_{1-6}$alkyl; optionally substituted $C_{6-10}$aryl; halogen; —OH; —NH$_2$; —COOH; —COO($C_{1-6}$alkyl); —NR$^a$R$^b$ wherein R$^a$ is H or $C_{1-6}$alkyl and R$^b$ is H or $C_{1-6}$alkyl; —NH—COR$^a$ wherein R$^a$ is H or $C_{1-6}$alkyl; —C(O)NR$^a$R$^b$, wherein R$^a$ is H or $C_{1-6}$alkyl, and R$^b$ is H, $C_{1-6}$alkyl; C(O)R$^a$ wherein R$^a$ is H or $C_{1-6}$alkyl; or —Y-Q, wherein:

Y is selected from: —O—, —NH—, —N($C_{1-6}$alkyl)-, —NHCONH—, —S—, —C(O)NH—, —C(O)N(CH$_3$)—, —NHC(O)—, —C(O)—, —NHC(NH)NH—, or absent, and Q is selected from: $C_{6-10}$aryl optionally substituted with —OH; 5-10 membered $C_{1-9}$heteroaryl; 3-10 membered $C_{1-9}$heterocyclyl; $C_{3-10}$cycloalkyl; $C_{1-6}$alkyl; $C_{1-6}$alkylacyl; $C_{2-6}$alkenyl; $C_{2-6}$alkynyl; and hydrogen.

The term "amide," "amido" or "aminocarbonyl" includes compounds or moieties which contain a nitrogen atom which is bound to the carbon of a carbonyl or a thiocarbonyl group.

The term "aryl" refers to aromatic monocyclic (eg phenyl) or polycyclic groups (e.g., tricyclic, bicyclic, e.g., naphthalene, anthryl, phenanthryl). Aryl groups can also be fused or bridged with alicyclic or heterocyclic rings which are not aromatic so as to form a polycycle (e.g., tetralin, methylenedioxyphenyl).

The term "heteroaryl", as used herein, represents a monocyclic or bicyclic ring, typically of up to 7 atoms in each ring, wherein at least one ring is aromatic and contains from 1 to 4 heteroatoms selected from the group consisting of O, N and S. Heteroaryl groups within the scope of this definition include but are not limited to: benzimidazole (otherwise known as benzoimidazole), acridinyl, carbazolyl, cinnolinyl, quinoxalinyl, pyrazolyl, indolyl, benzotriazolyl, furanyl, thienyl, benzothienyl, benzofuranyl, quinolinyl, isoquinolinyl, oxazolyl, isoxazolyl, indolyl, pyrazinyl, pyridazinyl, pyridinyl, pyrimidinyl, pyrrolyl, tetrahydroquinoline. As with the definition of heterocycle below, "heteroaryl" is also understood to include the N-oxide derivative of any nitrogen-containing heteroaryl. In cases where the heteroaryl substituent is bicyclic and one ring is non-aromatic or contains no heteroatoms, it is understood that attachment is via the aromatic ring or via the heteroatom containing ring, respectively.

The term "heterocycle" or "heterocyclyl" as used herein is intended to mean a 5- to 10-membered aromatic or nonaromatic heterocycle containing from 1 to 4 heteroatoms selected from the group consisting of O, N and S, and includes bicyclic groups. "Heterocyclyl" therefore includes the above mentioned heteroaryls, as well as dihydro and tetrahydro analogs thereof. Further examples of "heterocyclyl" include, but are not limited to the following: benzoimidazolyl, benzofuranyl, benzofurazanyl, benzopyrazolyl, benzotriazolyl, benzothiophenyl, benzoxazolyl, carbazolyl, carbolinyl, cinnolinyl, furanyl, imidazolyl, indolinyl, indolyl, indolazinyl, indazolyl, isobenzofuranyl, isoindolyl, isoquinolyl, isothiazolyl, isoxazolyl, naphthpyridinyl, oxadiazolyl, oxazolyl, oxazoline, isoxazoline, oxetanyl, pyranyl, pyrazinyl, pyrazolyl, pyridazinyl, pyridopyridinyl, pyridazinyl, pyridyl, pyrimidyl, pyrrolyl, quinazolinyl, quinolyl, quinoxalinyl, tetrahydropyranyl, tetrazolyl, tetrazolopyridyl, thiadiazolyl, thiazolyl, thienyl, triazolyl, azetidinyl, 1,4-dioxanyl, hexahydroazepinyl, piperazinyl, piperidinyl, pyridin-2-onyl, pyrrolidinyl, moyholinyl, thiomorpholinyl, dihydrobenzoimidazolyl, dihydrobenzofuranyl, dihydrobenzothiophenyl, dihydrobenzoxazolyl, dihydrofuranyl, dihydroimidazolyl, dihydroindolyl, dihydroisooxazolyl, dihydroisothiazolyl, dihydrooxadiazolyl, dihydrooxazolyl, dihydropyrazinyl, dihydropyrazolyl, dihydropyridinyl, dihydropyrimidinyl, dihydropyrrolyl, dihydroquinolinyl, dihydrotetrazolyl, dihydrothiadiazolyl, dihydrothiazolyl, dihydrothienyl, dihydrotriazolyl, dihydroazetidinyl, methylenedioxybenzoyl, tetrahydrofuranyl, and tetrahydrothienyl, and N-oxides thereof. Attachment of a heterocyclyl substituent can occur via a carbon atom or via a heteroatom. A referred to herein "heterocycloalkyl" refers to a saturated heterocyclyl group. In some embodiments the heterocycloalkyl group is optionally substituted with one or more OH and/or $CH_2OH$. An example of such a group is the simple sugar ribose.

The term "acyl" includes compounds and moieties which contain the acyl radical ($CH_3CO-$) or a carbonyl group such as $CH_3CH_2CH_2CO-$.

The term "alkoxy" includes substituted and unsubstituted alkyl, alkenyl, and alkynyl groups covalently linked to an oxygen atom. Examples of alkoxy groups include methoxy, ethoxy, isopropyloxy (isopropoxy), propoxy, butoxy, and pentoxy groups and may include cyclic groups such as cyclopentoxy.

The term "carbonyl" or "carboxy" includes compounds and moieties which contain a carbon connected with a double bond to an oxygen atom, and tautomeric forms thereof. Examples of moieties that contain a carbonyl include aldehydes, ketones, carboxylic acids, amides, esters, anhydrides, etc. The term "carboxy moiety" or "carbonyl moiety" refers to groups such as "alkylcarbonyl" groups wherein an alkyl group is covalently bound to a carbonyl group, "alkenyl carbonyl" groups wherein an alkenyl group is covalently bound to a carbonyl group, "alkynylcarbonyl" groups wherein an alkynyl group is covalently bound to a carbonyl group, "arylcarbonyl" groups wherein an aryl group is covalently attached to the carbonyl group. Furthermore, the term also refers to groups wherein one or more heteroatoms are covalently bonded to the carbonyl moiety. For example, the term includes moieties such as, for example, aminocarbonyl moieties, (wherein a nitrogen atom is bound to the carbon of the carbonyl group, e.g., an amide), aminocarbonyloxy moieties, wherein an oxygen and a nitrogen atom are both bond to the carbon of the carbonyl group (e.g., also referred to as a "carbamate"). Furthermore, aminocarbonylamino groups (e.g., ureas) are also include as well as other combinations of carbonyl groups bound to heteroatoms (e.g., nitrogen, oxygen, sulfur, etc. as well as carbon atoms). Furthermore, the heteroatom can be further substituted with one or more alkyl, alkenyl, alkynyl, aryl, aralkyl, acyl, etc. moieties.

The term "thiocarbonyl" or "thiocarboxy" includes compounds and moieties which contain a carbon connected with a double bond to a sulfur atom. The term "thiocarbonyl moiety" includes moieties that are analogous to carbonyl moieties. For example, "thiocarbonyl" moieties include aminothiocarbonyl, wherein an amino group is bound to the carbon atom of the thiocarbonyl group, furthermore other thiocarbonyl moieties include, oxythiocarbonyls (oxygen bound to the carbon atom), aminothiocarbonylamino groups, etc.

The term "ester" includes compounds and moieties that contain a carbon or a heteroatom bound to an oxygen atom that is bonded to the carbon of a carbonyl group. The term "ester" includes alkoxycarboxy groups such as methoxycarbonyl, ethoxycarbonyl, propoxycarbonyl, butoxycarbonyl, pentoxycarbonyl, etc. The alkyl, alkenyl, or alkynyl groups are as defined above.

The term "hydroxy" or "hydroxyl" includes groups with an —OH.

The term "halogen" includes fluorine, chlorine, bromine and iodine. In some embodiments halogen refers to fluorine or chlorine.

The terms "polycyclyl" or "polycyclic" include moieties with two or more rings (e.g., cycloalkyls, cycloalkenyls, cycloalkynyls, aryls and/or heterocyclyls) in which two or more carbons are common to two adjoining rings, e.g., the rings are "fused rings". Rings that are joined through non-adjacent atoms are termed "bridged" rings.

It is to be understood that all of the compounds of the invention will further include bonds between adjacent atoms and/or hydrogens as required to satisfy the valence of each atom. That is, double bonds and/or hydrogen atoms are typically added to provide the following number of total bonds to each of the following types of atoms: carbon: four bonds; nitrogen: three bonds; oxygen: two bonds; and sulfur: two, four or six bonds. It is also to be understood that definitions given to the variables of the generic formulae described herein will result in molecular structures that are in agreement with standard organic chemistry definitions and knowledge, e.g., valency rules.

It will be noted that the structures of some of the compounds of this invention include asymmetric carbon atoms. It is to be understood accordingly that the isomers arising from such asymmetry (e.g., all enantiomers, stereoisomers, rotamers, tautomers, diastereomers, or racemates) are included within the scope of this invention. Such isomers can be obtained in substantially pure form by classical separation techniques and by stereochemically controlled synthesis. Furthermore, the structures and other compounds and moieties discussed in this application also include all tautomers thereof. Compounds described herein may be obtained through synthetic strategies known in the art.

The invention will be further described with reference to the following non-limiting examples.

EXAMPLES

Example 1

The polymer beads were prepared in accordance with the process of the present invention using the following raw materials:
1. Water: Continuous phase in which the organic phase is dispersed and then reacted.
2. Gosenhol® GH20: a high molecular weight polymeric surfactant, a polyvinyl alcohol which disperses the organic phase in the water as droplets.
3. Cyclohexanol: a porogen which is a solvent for monomer and non-solvent for the polymer, and it promotes the formation of voids and internal porosity in the resin beads.
4. Fatty Alcohol Ethoxylates: this is the polymeric porogen, that gives pitted surface.
5. Solsperse 24000: it is a solid phase dispersing agent and is block copolymer of poly(hydroxystearic acid) and poly(ethyleneimine).
6. ϒ-iron oxide, this is the magnetic oxide that makes the resin beads magnetic.
7. TMPTA (TRIMETHYLOLPROPANE TRIACRYLATE): this is the monomer that crosslinks the beads.
8. GMA (glycidyl methacrylates): this is the monomer that is first polymerised to incorporate it into the beads, then it is quarternised to place quaternary ammonium groups into the beads, thereby creating the ion exchange sites.
9. Vazo®67: this is the catalyst that initiates polymerisation when the mixture is heated above 50° C.
10. Trimethylamine: this is the amine that reacts with the epoxy group of the glycidyl methacrylates to form quaternary ammonium ion exchange sites.
11. Hydrochloric acid: this is used to neutralise the high pH due to the trimethylamine.

Water (2333 g) was charged to a 5 liter reactor and the stirrer and nitrogen purge started. Next, Gosenhol GH20 (10 g) was added, and the water phase heated to 80° C. While the water was heating the first portion of Fatty Alcohol Ethoxylates (FAE) (260 g) and TMPTA (130 g) were charged to a separate mix tank and the stirrer turned on. The Solsperse 24000 (21.84) and the ϒ-iron oxide (325 g) were added in turn, then the mixture was stirred and sonicated for 20 minutes to thoroughly disperse the magnetic oxide. GMA (520 g), and remaining Fatty Alcohol. Ethoxylates (390 g) and the Vazo67 (2.65 g) were then added and the mixture was stirred for a further five minutes before adding it to the heated water phase. The resulting dispersion was then stirred and held at 80° C. for two hours. The nitrogen purge was stopped and a mixture of trimethylamine (687 g 25% w/w0 and hydrochloric acid (294 g, 36% w/w) added, then the mixture was stirred and held at 80° C. for a further three hours. The mixture was then cooled and the resulting polymer beads were cleaned with pure water or ethanol. A SEM (Scanning Electron Microscope) photo of the resulting beads is shown in FIG. 1. The SEM photo shows a highly pitted surface area with very few pores up to the size of 1 μm.

Comparative Example 1

Figure 2:
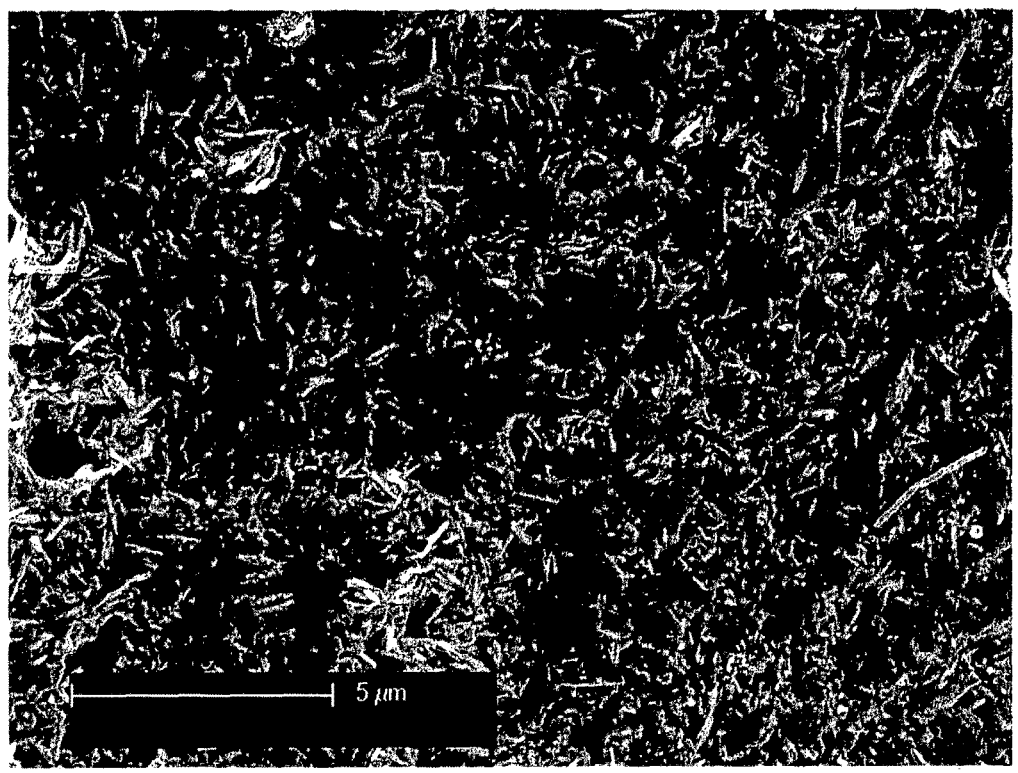
FIG. 2 illustrates the smooth surface of polymer beads prepared according to comparative Example 1.

Polymer beads were prepared in the manner of Example 1, except that DVB-55 (divinyl benzene) was used as the crosslinking agent and cyclohexanol was used as the porogen. A SEM photo of the resulting beads is shown in FIG. 2. The SEM photo shows a very smooth surface (relatively no pitting) with large pores up to 1 μm in diameter.

Comparative Example 2

Figure 3:
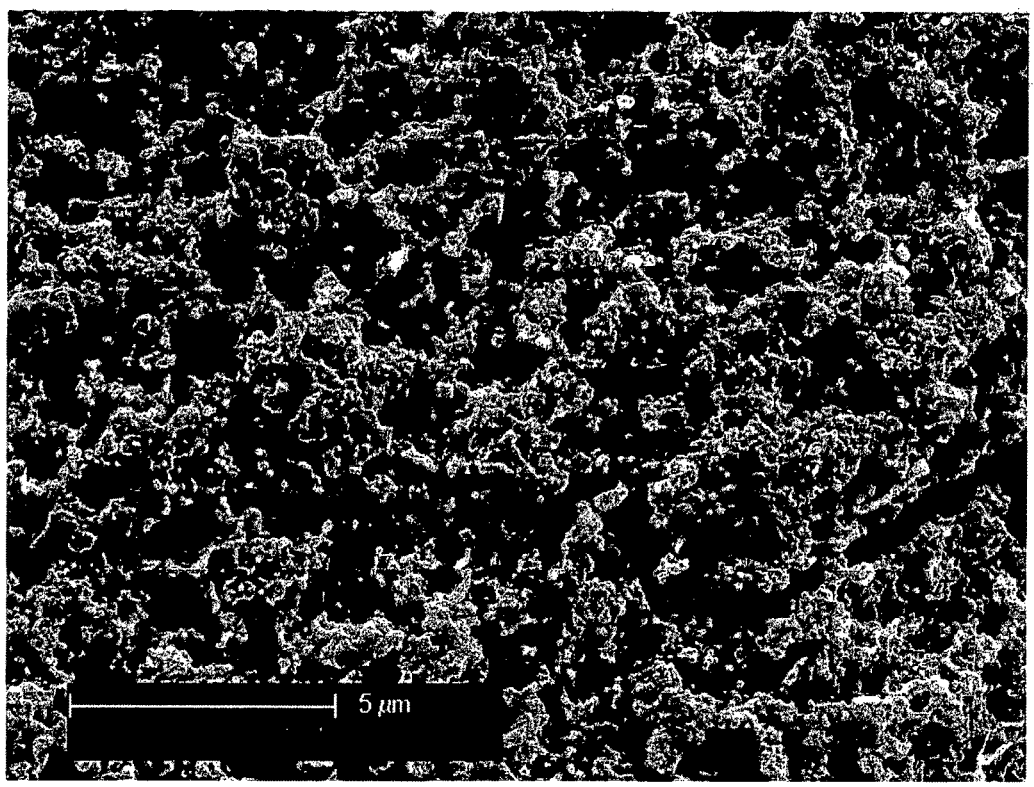
FIG. 3 illustrates highly porous polymer beads prepared according to comparative Example 2.

Polymer beads were prepared in the manner of Example 1, except the ϒ-iron oxide, Solsperse 24000 and first portion of porogen were not added. White beads without any iron oxide were obtained. A SEM photo of the resulting beads is shown in FIG. 3. The SEM photo shows a high degree of internal porosity with the pore size from 0.5-2 um.

Comparative Example 3

Figure 4:
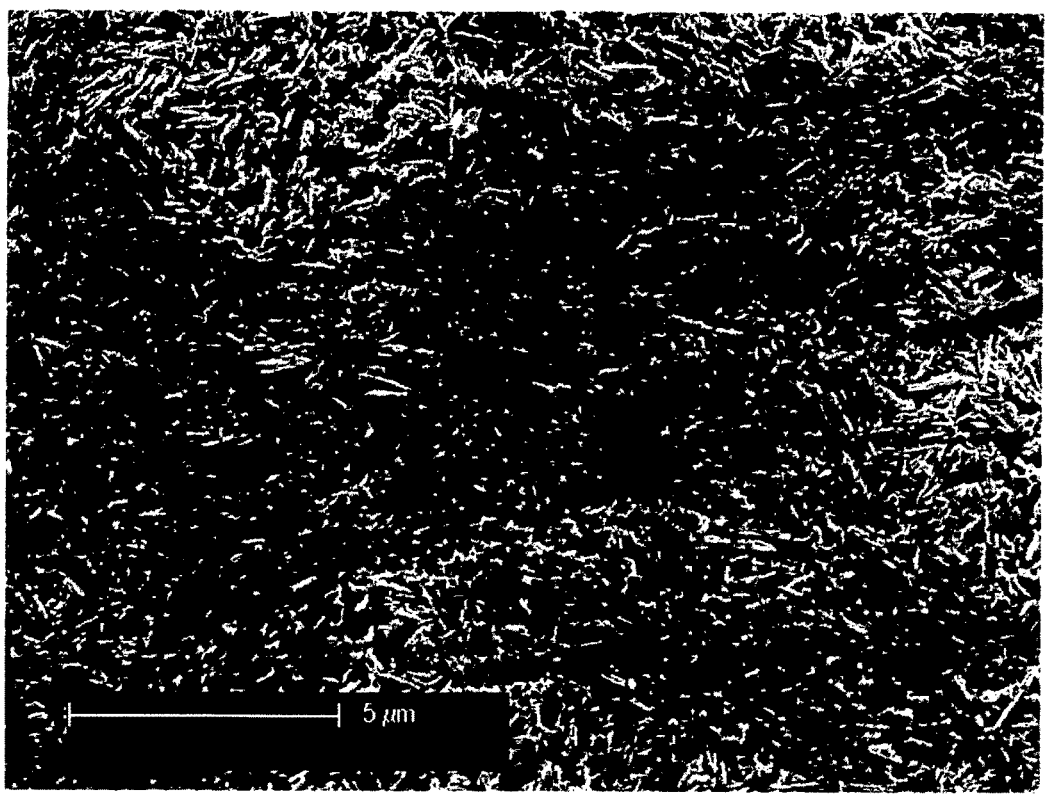
FIG. 4 illustrates the smooth surface of polymer beads prepared according to comparative Example 3.

Polymer beads were prepared in the manner of Example 1, except the crosslinker was replaced with DVB. A brown resin was obtained and SEM photo of the resulting beads is shown in FIG. 4. The surface of the bead is largely very smooth, though a patchy area with some roughness can be observed. The beads do not exhibit the degree of surface pitting shown in FIG. 1.

Example 2

Polymer beads were prepared in the manner of Example 1, except the first portion of polymeric porogen (FAE) is replaced with cyclohexanol. Brown beads were obtained. The beads showed similar surface pitting as Example 1.

Example 3

Figure 5:
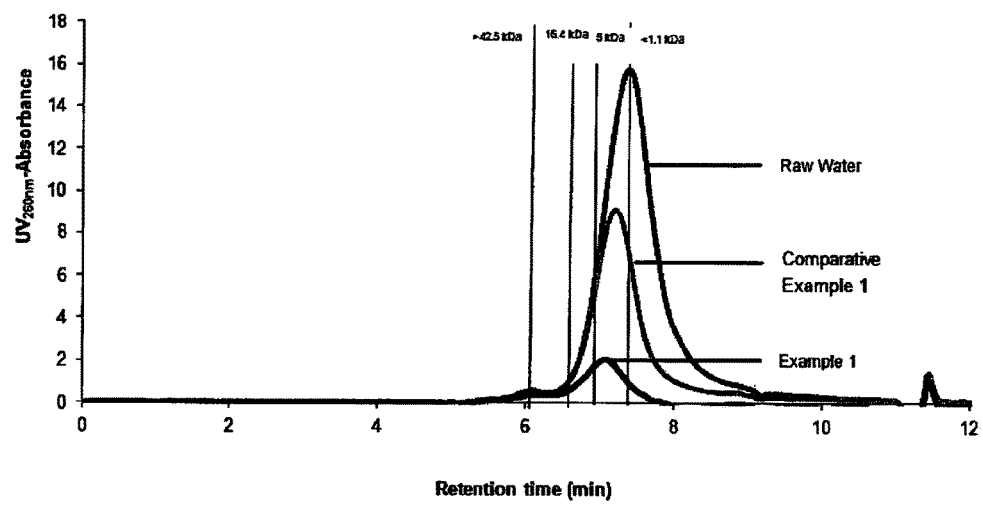
FIG. 5 illustrates the DOC removal capacity of polymer beads according to Example 3.

12 mg/L (as carbon) humic acid was added into deionised water. Jar test with resin from Example 1 and Comparative Example 1 were tested at 200 BV (bed volume). Dissolved Organic Carbon (DOC) levels were determined using total organic carbon analysers Analytik Jena 3100S. The sample from Comparative Example 1 showed that the dissolve organic carbon (DOC) removal is only 26.8% while beads from Example 1 is 61.0%. High Pressure Size Exclusion chromatography (HPSEC) results in FIG. 5 showed that Comparative Example 1 removed the DOC with the molecular weight below 5000 Dalton, but Example 1 resin not only removed the DOC below 5000 Dalton, but also removed DOC up to 16400 Dalton.

Example 4

Resin made from Example 2 and comparative example 1 were tested in a full water treatment plant in Melbourne, Australia. The test was carried out for 2 months period of time and the water treatment plant was run at same process condition for both resins. UV-Absorbance at 254 nm was determined using UV/Vis Spectrophotometers (Varian 50 Conc). True Colour is measured using Spectroquant (Merck Nova 60). On average, the raw water contained 12.20 mg/L of DOC, 38 m-1 of UV254 absorbance and true colour of 44 HU. Resin made from example 2 showed better DOC, UV254 and Colour removal against comparative Example 1. Example 2 resin had a residual DOC level of 5.7 mg/L, UV254 absorbance of 9 $m^{-1}$ and true colour of 10 HU. While comparative Example 1 resin treated water had a residual DOC level of 6.71 mg/L, UV254 absorbance of 19 $m^{-1}$ and true colour of 26 HU (see Table 1).

TABLE 1

| Parameters | Raw water | Comparative Example 1 | Example 2 |
|---|---|---|---|
| DOC (mg/L) | 12.20 | 6.71* | 5.70 |
| UVA (m-1) | 38 | 19 | 9 |
| True Colour (HU) | 44 | 26 | 10 |

Example 5

Jar test using polymer bead samples made from Example 2 and comparative Example 1 were carried with two water sources (A and B) from United Kingdom. Results are shown in Table 2. DOC removal rates at Water source A using Example 2 resin were up to 62% better than comparative Example 1 (for same BV)

DOC removal rates at water source B using Example 2 resin were up to 68% better than comparative Example 1 resin (for same BV)

Figure 6:
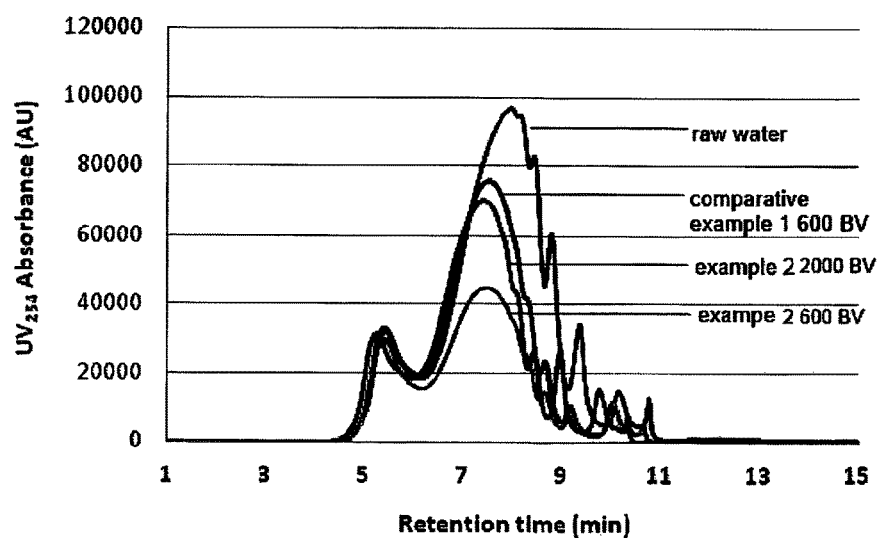
FIG. 6 illustrates water source B jar test HPSEC data for polymer beads prepared according to Example 2 and polymer beads prepared according to comparative Example 1.

Beads from Example 2 could achieve similar treated water quality at 2,000 BV as comparative Example 1 at 600 BVTR HPSEC results are presented in FIG. 6 for the water source B jar test. It shows that Example 2 has a significant improvement in removal of organic material in the size range of >5 kDa.

TABLE 2

| Source | Bead type | Parameter | Raw | 600 BV | 1000 BV | 2000 BV |
|---|---|---|---|---|---|---|
| UK water A | Comparative Example 1 | DOC (mg/L) | 8.0 | 5.2 | 5.5 | 5.9 |
| | | UV254 (m$^{-1}$) | 36.5 | 17.9 | 20.0 | 22.9 |
| | Example 2 | DOC (mg/L) | 8.0 | 4.0 | 4.2 | 4.6 |
| | | UV254 (m$^{-1}$) | 36.5 | 15.1 | 16.6 | 18.7 |
| UK water B | Comparative Example 1 | DOC (mg/L) | 10.6 | 6.7 | 7.3 | 8.1 |
| | | UV254 (m$^{-1}$) | 45.7 | 27.3 | 30.2 | 34.0 |
| | Example 2 | DOC (mg/L) | 10.6 | 5.5 | 5.7 | 6.4 |
| | | UV254 (m$^{-1}$) | 45.7 | 18.8 | 20.9 | 24.7 |

The reference in this specification to any prior publication (or information derived from it), or to any matter which is known, is not, and should, not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. Polymer beads having:
   (i) a polymeric matrix comprising polymerised monomer residues of (a) at least one monoethylenically unsaturated monomer, and (b) at least one crosslinking monomer having at least two ethylenically unsaturated groups separated by at least 4 consecutive acyclic atoms, and
   (ii) a pitted surface comprising porogen-derived pits, wherein the polymeric matrix has distributed therethrough magnetic solid particulate material and polymeric porogen, and wherein the internal polymeric matrix of the beads has a porogen-derived porosity less than that of the pitted surface.

2. The polymer beads according to claim 1, wherein the at least one crosslinking monomer is selected from ethylene glycol dimethacrylate, poly(ethylene glycol) dimethacrylate, methylene bisacrylamide, triethylene glycol diacrylate, triethylene glycol dimethacrylate, ethylene glycol diacrylate, diethylene glycol diacrylate, diethylene glycol dimethacrylate, glycerol diacrylate, glycerol dimethacrylate, 1,3-butanediol diacrylate and 1,3-butanediol dimethacrylate, 1,3-propanediol diacrylate, 1,3-propanediol dimethacrylate, 1,3-pentanediol diacrylate, 1,3-pentanediol dimethacrylate, 1,4-butanediol diacrylate, 1,4-butanediol dimethacrylate, hexamethylene glycol diacrylate, hexamethylene glycol dimethacrylate, decamethylene glycol diacrylate, decamethylene glycol dimethacrylate, 2,2-dimethylolpropane diacrylate, 2,2-dimethylolpropane dimethacrylate, tripropylene glycol diacrylate, tripropylene glycol dimethacrylate, 2,2-di (p-hydroxyphenyl)propane diacrylate, 2,2-di(p-hydroxyphenyl)propane dimethacrylate, 2,2,4-trimethyl-1,3-pentanediol diacrylate, 2,2,4-trimethyl-1,3-pentanediol dimethacrylate, tetraethylene glycol diacrylate, tetraethylene glycol dimethacrylate, and combinations thereof.

3. The polymer beads according to claim 1, wherein the at least one crosslinking monomer is selected from trimethylolpropane triacrylate, trimethylolpropane trimethacrylate, pentaerythritol triacrylate, pentaerythritol trimethacrylate, glycerol triacrylate, glycerol trimethacrylate, pentaerythritol tetraacrylate, pentaerythritol tetramethacrylate, tris(2-hydroxy ethyl) isocyanurate triacrylate, ethoxylated trimethylolpropane triacrylate, ethoxylated trimethylolpropane trimethacrylate, propoxylated trimethylolpropane triacrylate, propoxylated trimethylolpropane trimethacrylate, ethoxylated glycerol triacrylate, ethoxylated glycerol trimethacrylate, propoxylated glycerol triacrylate, propoxylated glycerol trimethacrylate, ethoxylated pentaerythritol triacrylate, ethoxylated pentaerythritol trimethacrylate, propoxylated pentaerythritol triacrylate, propoxylated pentaerythritol trimethacrylate, ethoxylated pentaerythritol tetraacrylate, ethoxylated pentaerythritol tetramethacrylate, propoxylated pentaerythritol tetraacrylate, propoxylated pentaerythritol tetramethacrylate, and combinations thereof.

4. The polymer beads according to claim 1, wherein the magnetic solid particulate material is selected from maghemite, magnetite, chromium dioxide, and combinations thereof.

5. The polymer beads according to claim 1, wherein the polymeric porogen is selected from poly(vinyl methyl ether), poly(ethylene oxide), poly(vinyl acetate), poly(methyl methacrylates), poly(vinyl acetate co-maleic or fumaric acid and esters), fatty alcohol ethoxylates, fatty alcohol alkoxylates, alcohol alkoxylates, fatty acid ethoxylates, castor oil ethoxylates, fatty amine ethoxylates, alkylphenol ethoxylates, alkyl ethoxy carboxylic acids, and combinations thereof.

6. The polymer beads according to claim 1, wherein the polymeric matrix is functionalised with functional groups that provide the polymer beads with ion exchange capacity.

7. The polymer beads according to claim 6, wherein the ion exchange capacity is provided by amine or acid functional groups.

8. A method of treating an aqueous solution, the method comprising contacting said aqueous solution with polymer beads according to claim 1.

9. A method of removing dissolved organic carbon from an aqueous solution, the method comprising (i) contacting said aqueous solution with polymer beads according to claim 1, and (ii) removing from the aqueous solution polymer beads having dissolved organic carbon adsorbed thereon.

10. A method of removing ions from an aqueous solution, said method comprising (i) contacting said aqueous solution with polymer beads according to claim 6, and (ii) removing from the aqueous solution polymer beads that have undergone ion exchange with the ions to be removed.

* * * * *